(12) United States Patent
Wright et al.

(10) Patent No.: US 8,231,699 B2
(45) Date of Patent: Jul. 31, 2012

(54) MEMBRANE AIR DRYER

(75) Inventors: Eric Wright, Evans Mill, NY (US);
Richard Kohar, Kingston (CA)

(73) Assignee: New York Air Brake Corporation, Watertown, NY (US)

( * ) Notice: Subject to any disclaimer, the term of this patent is extended or adjusted under 35 U.S.C. 154(b) by 729 days.

(21) Appl. No.: 12/250,074

(22) Filed: Oct. 13, 2008

(65) Prior Publication Data
US 2010/0089239 A1  Apr. 15, 2010

(51) Int. Cl.
*B01D 45/00* (2006.01)
(52) U.S. Cl. .......... 55/423; 55/312; 55/385.1; 55/418.1; 55/420; 55/DIG. 17; 96/4; 96/10
(58) Field of Classification Search ................. 55/418.1, 55/420, 312, 385.1, DIG. 17, 423; 96/4, 96/10
See application file for complete search history.

(56) References Cited

U.S. PATENT DOCUMENTS

| | | | |
|---|---|---|---|
| 1,652,309 A | 12/1927 | Kingdon | |
| 2,010,456 A | 8/1935 | Jones | |
| 2,739,713 A | 3/1956 | Robinson | |
| 2,841,420 A | 7/1958 | Woolsey et al. | |
| 3,487,932 A | 1/1970 | Forrester et al. | |
| 4,909,937 A | 3/1990 | Hoffmann et al. | |
| 4,929,259 A | 5/1990 | Caskey | |
| 5,286,283 A * | 2/1994 | Goodell ........................ | 96/113 |
| 5,375,620 A | 12/1994 | Ginder, Jr. | |
| 5,525,143 A | 6/1996 | Morgan et al. | |
| RE35,433 E | 1/1997 | Alexander, III | |
| 6,013,118 A | 1/2000 | Matsunuma et al. | |
| 6,074,177 A * | 6/2000 | Kobayashi et al. ........... | 417/313 |
| 6,077,330 A * | 6/2000 | Sabelstrom ...................... | 95/11 |
| 6,128,825 A | 10/2000 | Cunkleman | |
| 6,136,073 A | 10/2000 | Coan | |
| 6,174,351 B1 | 1/2001 | McDowell et al. | |
| 6,719,825 B2 | 4/2004 | Wedge et al. | |
| 6,776,820 B2 | 8/2004 | Bikson | |
| 7,334,847 B2 | 2/2008 | Goodell | |
| 2002/0170432 A1 * | 11/2002 | Cartellone ...................... | 95/268 |
| 2003/0066427 A1 | 4/2003 | Ishida | |
| 2004/0094036 A1 | 5/2004 | Nichols et al. | |
| 2006/0037476 A1 * | 2/2006 | Edlund et al. ...................... | 96/4 |
| 2006/0179800 A1 * | 8/2006 | Williams et al. ................ | 55/312 |
| 2007/0159000 A1 * | 7/2007 | McLaughlin et al. .......... | 303/86 |
| 2008/0087167 A1 | 4/2008 | Wright et al. | |

FOREIGN PATENT DOCUMENTS

| | | |
|---|---|---|
| EP | 1 275 432 | 1/2003 |
| WO | WO 2006 / 034840 | 4/2006 |
| WO | WO 2007 / 041559 | 4/2007 |
| WO | WO 2007/090085 A | 8/2007 |

OTHER PUBLICATIONS

Notification of Transmittal of the International Search Report and the Written Opinion of the International Searching Authority, or the Declaration for PCT/US2009/053475, Aug. 11, 2009.
Written Opinion of the International Searching Authority for PCT/US2009/053475, Aug. 11, 2009.

* cited by examiner

*Primary Examiner* — Jason M Greene
*Assistant Examiner* — Anthony Shumate (57) ABSTRACT

A filter having two drain valves piloted by an electro-pneumatic valve. A check valve may be provided to by pass the filter. A membrane filter housing may include vanes extending into a reservoir in which the membrane filter extends. Also, one of the circumferential recesses of the bore for the membrane filter is in the reservoir.

6 Claims, 8 Drawing Sheets

MEMBRANE AIR DRYER

CROSS REFERENCE

This application is related to and incorporates by reference U.S. provisional application Ser. No. 60/829,042 filed Oct. 11, 2006 and U.S. non-provisional application Ser. No. 11/736,253 filed Oct. 11, 2007.

BACKGROUND AND SUMMARY OF THE DISCLOSURE

The present invention relates generally to air dryers, and more specifically, to an air dryer with an integral pre-filter for a brake system for vehicles.

Air dryers employing membranes consisting of a permeable membrane are capable of blocking the passage of nitrogen and oxygen molecules, but allowing water vapor molecules to pass through, as described in U.S. Pat. Nos. 6,719,825 and 5,525,143 amongst many others. In one variation of the technology, the air to be dried passes through the center of the membrane element. The membrane permits the passage of the water vapor to the outside of the membrane, but prevents the passage of the air to the outside of the membrane, thereby drying the air.

To work effectively, the outside of the membrane must be kept dry and at a lower pressure than the inside, creating the partial pressure differential to drive the water vapor out. This is done by providing some fraction of the dry output air as a counter flow sweep air across the outside of the membrane. The sweep air can be provided by sweep air orifice(s) connecting the dry air in the membrane air dryer outlet to the sweep air chamber surrounding the outside of the membrane. The orifices control the volume of sweep air, typically 10-20% of the dryer capacity and create a pressure drop in the sweep air volume. The sweep air and entrapped moisture are expelled to atmosphere.

U.S. Pat. No. 6,719,825 shows a control valve at the inlet for the sweep air. U.S. Pat. No. 5,375,620 shows a self-adjusting flow metering device for the sweep air. An air dryer including a coalescing and charcoal pre-filters and a membrane filter is also shown by U.S. Pat. No. 6,719,825.

The present disclosure is directed to a filter having a housing with at least a coalescing filter element, two drains in the housing and a drain valve assembly connected to the drains. The drain valve assembly includes first and second pneumatic valves each having an inlet connected to a respective drain, an outlet and a valve element for selectively connecting the inlet to the outlet in response to a pilot pressure on a pilot port. A third electric-pneumatic valve is connected to the pilot port of each first and second valves for providing the pilot pressure from an inlet port to the pilot ports when the third valve is actuated. The filter includes a heater positioned adjacent the first and second valves.

The disclosure is also directed to a filter having a check valve connected in parallel to the filter's inlet and outlet to bypass the filter when pressure at the inlet exceeds the pressure at the outlet by a set value.

The disclosure is also directed to a filter including a membrane separator mounted in a bore of the housing and extending cantileverly from the housing and the housing includes circumferentially spaced vanes extending along an axis of the bore. An end of the bore is a split collar and a clamp secures the membrane separator in the split collar. The bore has two axially spaced circumferential recess connecting the bore to a source of sweep air and an exhaust port respectively. A sweep air inlet and a outlet on a circumference of the membrane separator are aligned with respective recess and at least one of the recesses is in the reservoir.

The filter includes a conical filter element connected in series between the filter inlet and an inlet of the membrane separator and the filter element has a larger diameter at an inlet of the filter element than a diameter at an outlet of the filter element. An annular chamber connects the filter inlet to the filter element inlet and an end face of the filter element forms a wall of the annular chamber. The housing includes first and second portion removeably connected to each other; and the filter element includes a flange at the inlet of the filter element clamped by the first and second portions.

The filter is to be mounted in a reservoir inlet and extending into the interior of the reservoir so that an inlet of the filter is the inlet of the reservoir and an outlet of the filter is interior the reservoir. The drains are exterior the reservoir.

These and other aspects of the present method will become apparent from the following detailed description of the method, when considered in conjunction with accompanying drawings.

DETAILED DESCRIPTION OF THE PREFERRED EMBODIMENTS

Figure 1:
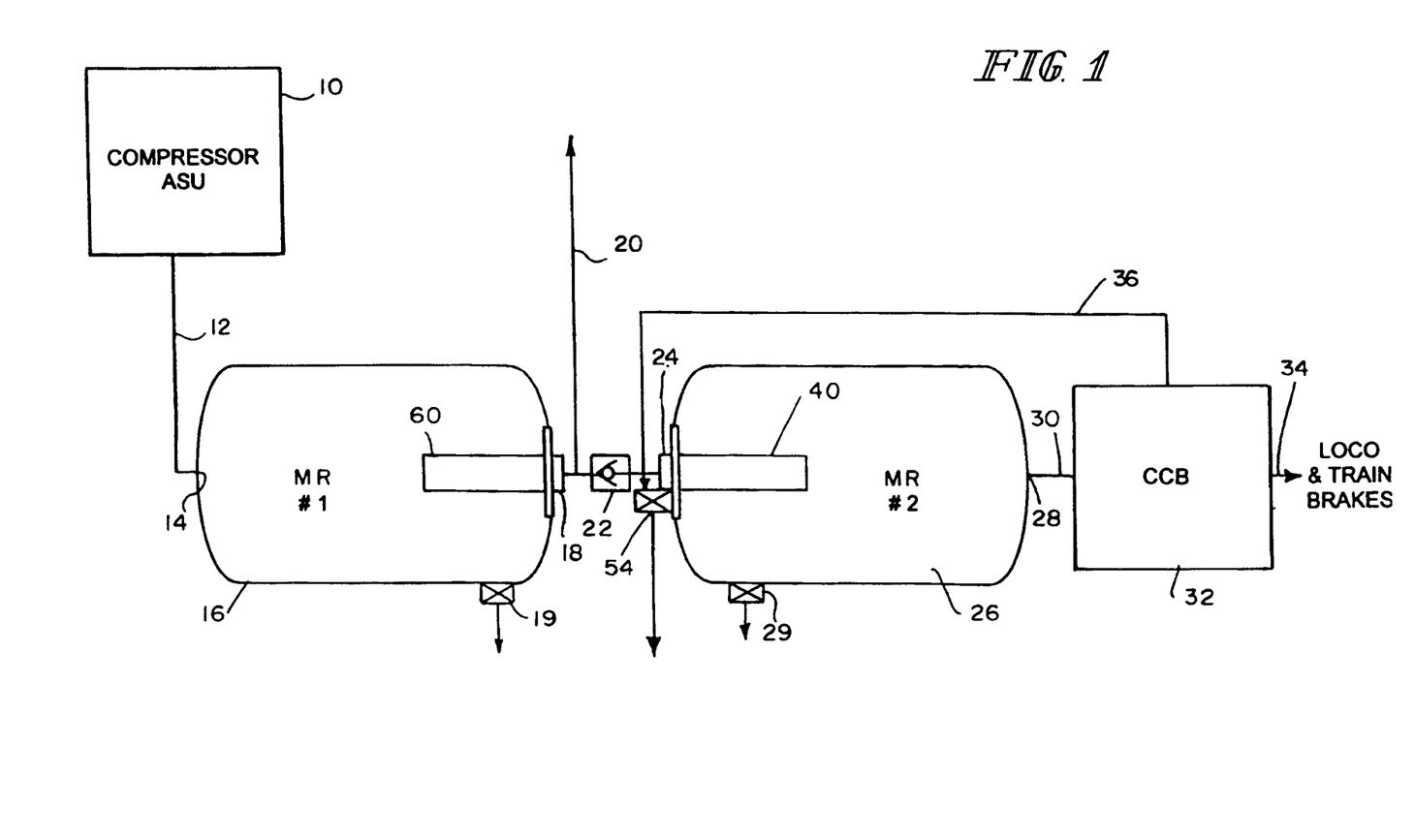
FIG. 1 is a schematic of a locomotive air supply and brake controller according to the present disclosure.

A locomotive brake supply and brake controller is shown in FIG. 1. A compressor 10 driven by the engines of the locomotive provides a source of compressed air through line 12 to inlet 14 of the first main reservoir MR 16. The outlet 18 of the reservoir 16 is connected to other non-brake air consuming devices at line 20. The outlet 18 is also connected to the inlet 24 of the second main reservoir 26 via one-way check valve 22. The outlet 28 of the second main reservoir MR 26 is connected to a brake controller illustrated as a CCB computer controlled brake system 32. The outlet 34 of the computer controlled brake system 32 provides an appropriate pneumatic control signals for the locomotive and train brakes.

As will be discussed below, the computer controlled brake system 32 provides, via line 36, control of the drain 54 of membrane air filter 40 within the main reservoir 26. This not only controls the drain, but may also be used to control the air flow in the sweep air passages. Alternatively, the control of the sweep air passages may be provided on the input of the air sweep passage as also described below. Control of drain valves 19 and 29 of the first main reservoir MR 16 and reservoir 26 may be either from the computer brake control system 32 or other control systems on the locomotive or manually.

The main reservoir 16 includes a coalescing pre-filter 60 therein. Coalescing pre-filter 60, although shown schematically in the outlet 18 of MR 16, can alternately be provided in the inlet 14 of MR 16.

Figure 2:
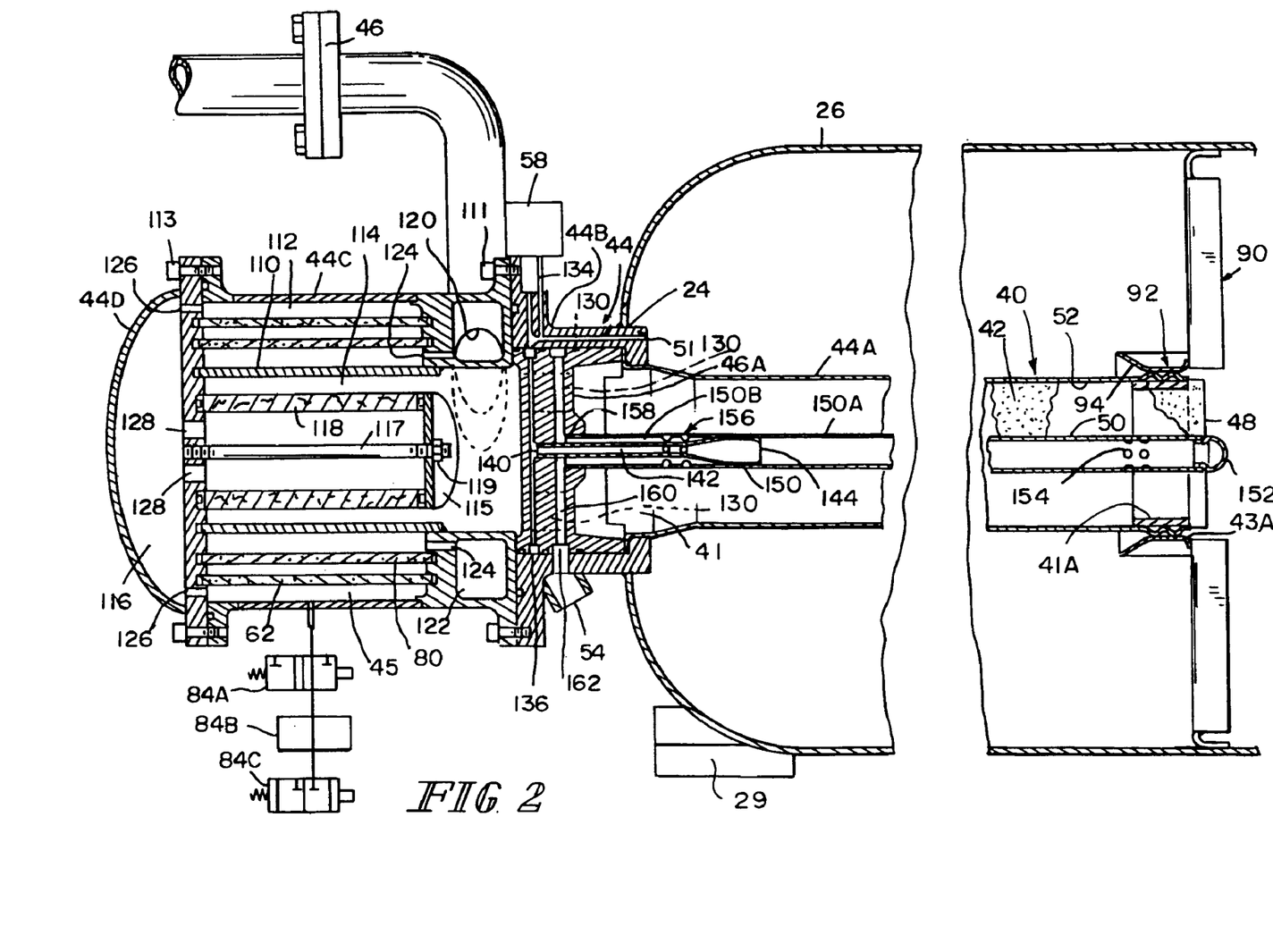
FIG. 2 is an embodiment of a membrane air dryer with integral particulate, coalescing and charcoal pre-filters according to the present disclosure.

A membrane air dryer 40 is shown in FIG. 2 as including a housing 44 with an air inlet 46, an air outlet 48 and a liquid drain outlet 54. A membrane separator 42 is shown schematically with an inner surface and an outer surface extending between a first and second ends of the membrane 42. Typical construction of a membrane module is a bundle of small diameter hollow fibers (membrane), each with an inner surface and an outer surface extending between a first and second ends of the membrane. A first passage 50, made up of the inner diameters of each of the hollow fiber membranes in the housing 44 is connected to the air inlet 46 and air outlet 48 at its respective ends and extends between the first and second ends of the membrane 42 along one of the interior and the exterior of the membrane. A second passage 52 including the outer diameters of each of the hollow fiber membranes in the housing 44 is connected to the sweep air/drain outlet 54 and to a sweep air 51 inlet adjacent the housing's air inlet 46. The second passage 52 extends between the first and second ends of the membrane 42 along the other of the interior and the exterior of the membrane. A valve 58 is connected between the second passage 52 and the inlet 51 form the reservoir for controlling the sweep air flow through the second passage 52.

Most membrane dryers for industrial use have a constant sweep flow. This is undesirable on a locomotive as it wastes air and may deplete the air in the reservoir if the locomotive is idled with power shut off. Further, unlike many industrial uses, the air is consumed from the reservoirs 16 and 26 only intermittently by the pneumatic brake system. Main Reservoir 26, is generally protected by the check valve 22 and is used exclusively by the brakes. The membrane air dryer 40 for a locomotive solves this problem of wasted air due to a constant sweep flow by adding a solenoid controlled valve 58 to the input of the sweep air chamber 52.

When closed, the valve 58 closes the communication of the sweep volume through passage 52 to atmosphere, thereby preventing the venting of the sweep air. The solenoid valve 58 is controlled by the CCB computer controlled brake system 32 on the locomotive. The CCB 32, because it is a computer controlled brake system with transducers and other controls necessary for brake operation, can determine when the brakes are consuming air from the MR 26. In operation, the CCB 32 will open the valve 58 whenever the brake system is consuming air from MR 26, which allows the resumption of flow of sweep air around the outside of the membrane element 42 in passage 52 at the same time that moisture laden air is flowing into the inlet 46 of the air dryer 40 to replenish the air used by the brakes. Thus, the air dryer 40 only consumes sweep air when sweep air is needed to dry air flowing through the air dryer.

Further, the CCB 32 can maintain sweep flow for a period of time after the brake system is no longer consuming air from MR 26 before closing the valve 58 to assure that the MR 26 is fully replenished with dry air. Further, it can maintain sweep flow for an additional predetermined time to assure that the sweep air volume is free of moisture. The lag time, during which the sweep flow is maintained after air consumption by the brakes, can be calculated based on the air flow measured by the CCB 32 and the duration of the flow, knowledge of compressor 10 on-off pressure switch points, and knowledge of the compressor output capacity. The lag time can alternatively or concurrently be determined by monitoring the pressure increase in MR 26 as it is replenished by the air supply system. When the rate of pressure increases in MR 26 decreases to some pre-determined level and/or the pressure in MR 26 reaches the compressor control upper limit pressure, the sweep air is terminated. Optionally the lag time calculation could be optimized by CCB 32 reading a digital signal from the compressor control indicating whether the compressor is pumping or not.

Sweep flow would be enabled whenever 1) the brake system consumes air, 2) the compressor 10 is turned on and the pressure in MR 26 is less than the compressor pressure upper limit control, typically 145 psi, and 3) for some lag time after cessation of air consumption by the brakes, until the MR 26 is substantively recharged and the sweep air volume is substantively purged of moist air.

Figure 3:
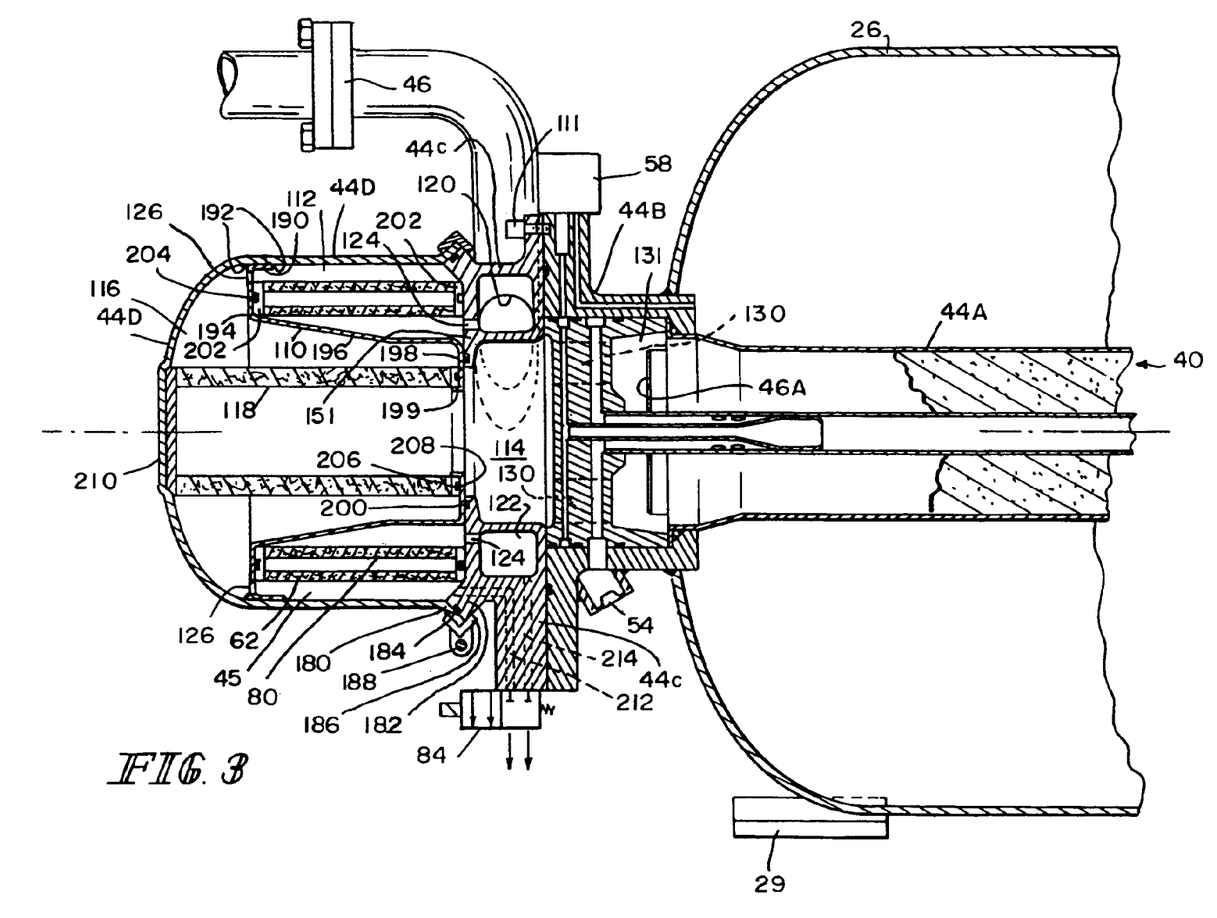
FIG. 3 is another embodiment of a membrane air dryer with integral particulate, coalescing and charcoal pre-filters according to the present disclosure.
Figure 4:
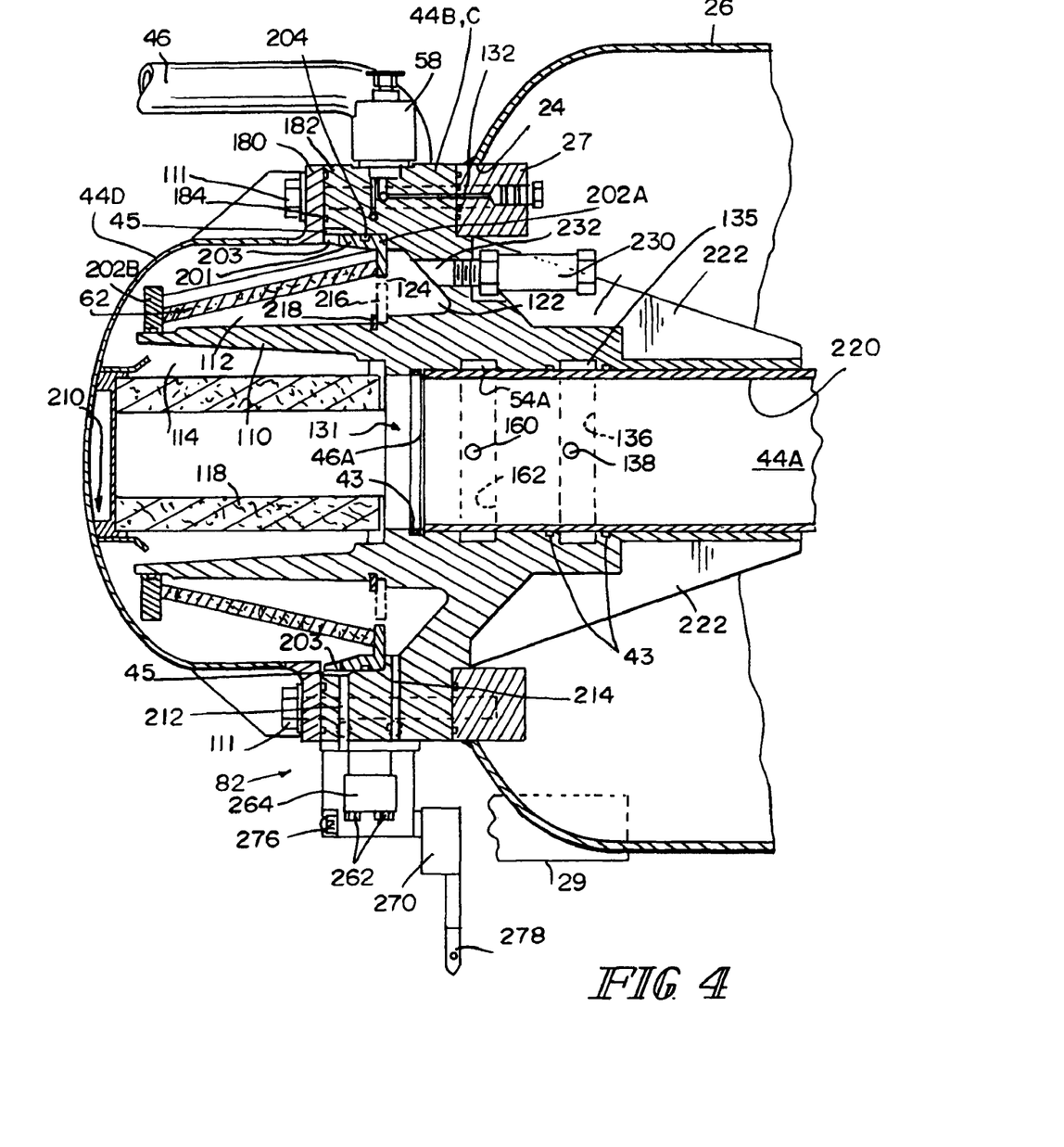
FIG. 4 is even another embodiment of a membrane air dryer with integral particulate, coalescing and charcoal pre-filters according to the present disclosure.
Figure 5:
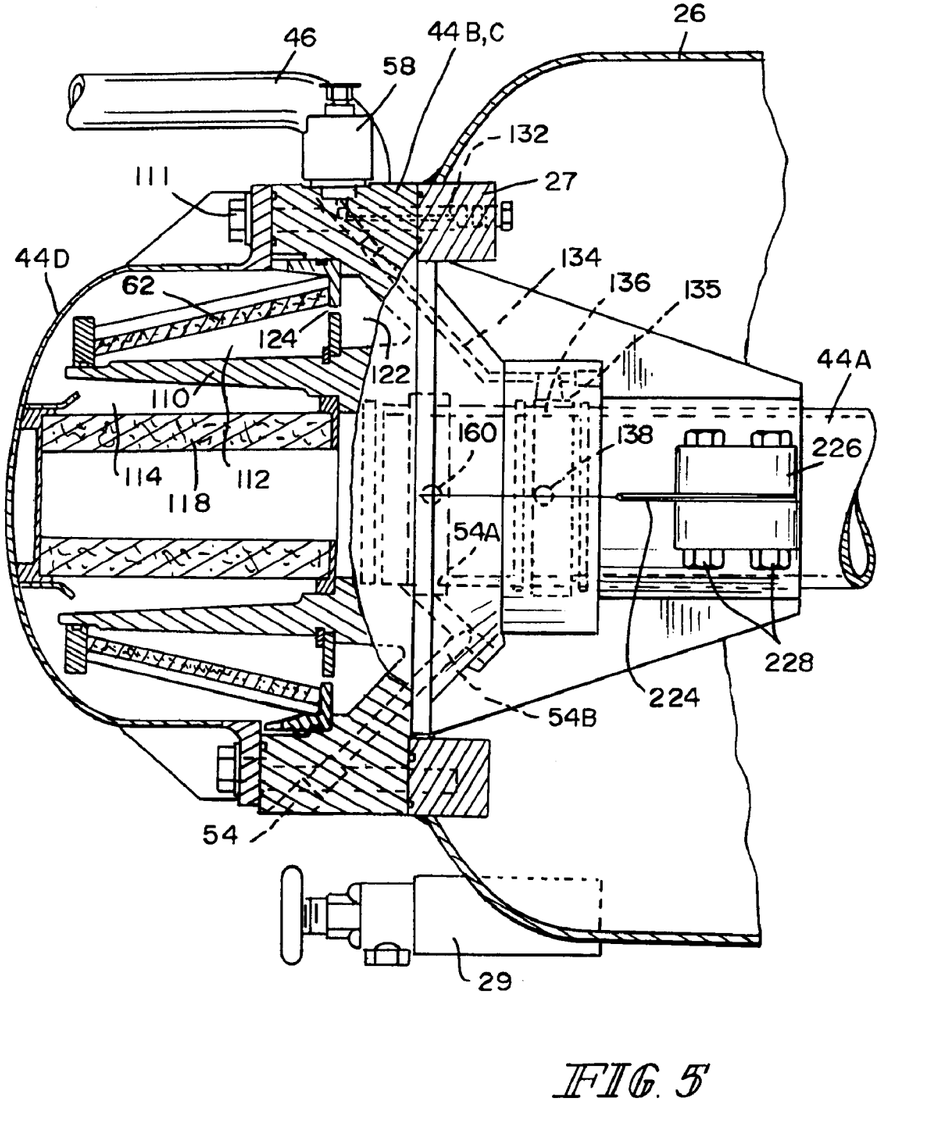
FIG. 5 is the embodiment of FIG. 4 without a bypass valve and a drain valve assembly showing the sweep air passages.
Figure 6:
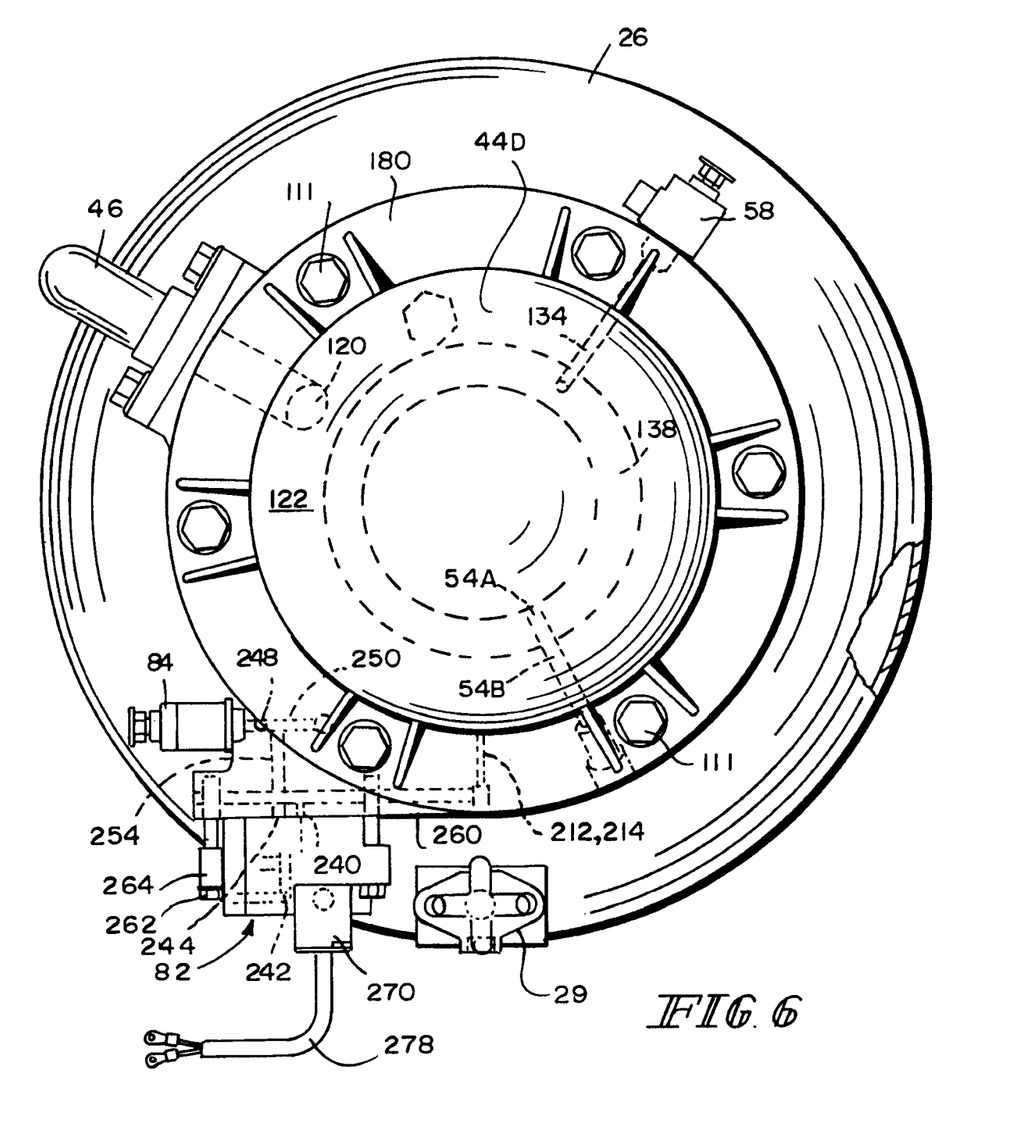
FIG. 6 is an end view of the embodiment of FIG. 4.

The air dryer housing 44 includes housing portion 44A which houses the membrane or separator element 42 and a housing portion 44B mounted in the opening in the inlet 24 of the reservoir 26, pre-filter housing portion 44C and a connecting housing portion 44D. The membrane filter housing portion 44A is removable from the housing potion 44B which is mounted to the reservoir 26 either welded as shown in FIGS. 2 and 3 or connected to a flange on the exterior of the outlet 24 of the reservoir 26 as shown in FIGS. 4-6. Fasteners 111, shown as bolts, secure the housing section 44C to the housing portion 44B. The housing portion 44D is mounted on the cover plate 47 and the cover plate 47 is secured to housing portion 44C by fasteners 113, also illustrated as bolts.

Cylindrical wall 110 divides housing portion 44C into an inner chamber 114 and a concentric outer chamber 112. The coalescer 62 and the filter 80 are concentrically mounted in the outer chamber 112. A third filter 118 which may be, for example, a charcoal filter, is mounted in the inner chamber 114. A cap 115 secures the filter 118 to the cover plate 47 by a nut 119 threaded onto thread shaft 117. Housing portion 44D forms a chamber 116 between itself and the cover plate 47.

The air inlet 46 for the reservoir and the air dryer is connected through aperture 120 in the wall of housing portion 44C. It is introduced into the wall of annular chamber 122. The oblong aperture 120 provides somewhat of a tangential entry so as to create a swirling or circumferential airflow. The input air in annular chamber 122 is provided through a plurality of inlets 124 in the housing portion 44C interior the filter 80 and coalescer 62. The outlet for chamber 112 is through a plurality of outlets 126 exterior the coalescer 62 into chamber 116. This produces the inward/outward flow through the coalescer 62. The filtered air in chamber 116 is introduced into the interior of filter 118 by a plurality of inlets 128. The triple filtered air in chamber 114 is then provided through a plurality of outlets 130 in collar or manifold 41 to an inlet chamber 131 for the inlet of the membrane filter 40.

The structure of the housing as shown allows for disassembly and removal of the four filter elements without modification of the reservoir 26. The removal of fasteners 113 allows the removal of the cover plate 47 with housing portion 44D. This allows access and removal of the coalescer 62, the filter 80 and access to the filter 118. Removal of nut 119 allows replacement of the filter 118. The removal of fasteners 111 allows removal of housing portion 44C which allows access to the collar 41 and the membrane filter housing 44A and the membrane filter 42 itself. The pre-filter of FIG. 2 may include less than all three filters 62, 80, and 118. For example one or more of filters 80 and 118 may be deleted and the pre-filter would still have the inward/outward flow through the coalescer 62.

The filters 62, 80 and 118 are concentric with each other and coaxial to the membrane separator 42. The air through inlet 46 passes through the filters 62, 80 and 118 prior to being received in the air inlet 46A of the membrane separator 42. As well-known, the coalescing filter element 62 precipitates airborne water and oil vapor from the air stream. The particulate filter 80 filters out very fine airborne dust and solid material such as carbon particles from diesel combustion or other contaminants or other particulates which contaminate the membrane dryer module 40.

The present design differentiates from the prior art in that the coalescing filter 62, the particulate filter 80, carbon filter 118 and the air dryer 40 of the prior art are all connected in series external to the reservoir 26. The present design is an improvement over the prior art in that merely removing the cover plate 47 allows replacement and maintenance of the filters 62, 80, 118 and the dryer 40. No major disassembly is required. While the coalescing filter element 62, the particulate filter 80 and the carbon filter 118 require annual maintenance, the membrane separator 42 would be replaced every six to eight years depending on actual service conditions.

The valves 84A and 84C and sump 84B control the draining of the liquid from sump portion 45 of chamber 112 exterior the coalescer 62.

The sweep air is controlled at the sweep air inlet 51 instead of the sweep air outlet and drain 54. The drain 54 is open and exposed to atmosphere. The control valve 58 is at the inlet 51. The housing portion 44B in combination with the collar 41 are constructed as a manifold and provide the appropriate interconnections.

The inlet 51 for the sweep air passage from the interior of the reservoir 26 is into passage 132 adjacent the inlet 44 of the membrane filter 40. Passage 132 is connected to the input of valve 58. The outlet of valve 58 is connected to passage 134 in housing portion 44B into circumferential chamber 136 in the collar manifold 41. A plurality of radial passages 138 connects the circumferential passage 136 to a centered inlet 140 in the collar 41. A tube 142 connects the inlet 140 to the interior of tube 150. The end 144 of tube 142 is flared and sealed to the interior of tube 150. This divides tube 150 into an inlet portion 150A and an outlet portion 150B. The inlet portion 150A exits out of a plurality of orifices 154 radially into the membrane filter 40 and flows through the first sweep air chamber or passage 52. Tube 142 and tube portion 150A form a second sweep air passage having an inlet 140 adjacent the air inlet 46, 120 and an outlet 154 adjacent the air outlet 48.

The circulation of air in chamber 52 is opposite or counter to the air at inlets 130 to the membrane filter. The outlet of the sweep air passage 52 enters tube section 150B through a plurality of openings 156. The outlet of tube section 150B is connected at 158 to a plurality of radial passages 160 which are connected to an annular passage 162 which is connected directly to the drain 54.

The sweep passage air at inlet 51 is controlled by valve 58 to circulate through tube 142 and tube section 150A substantially the length of the membrane filter 40 to inlet openings 154 into the membrane filter. The counterflow from inlets 154 to outlets 156 through the sweep air passage 52 then exits through tube section 150B to drain 54. While the exterior sweep air inlet 51 and air outlet 54 are adjacent the air inlet for the membrane filter, the interior openings 154 and 156 provide the appropriate counterflow required for the membrane filter.

It should be noted by controlling the sweep air at the inlet of the membrane filter, it eliminates pressure cycling of the membrane bundle which can result in fatigue failure of the membrane fibers. This would limit their useful life. Thus, the outlet and the membrane are continuously exposed to atmospheric pressure which is 14.7 psi. When the sweep air is flowing, the sweep air pressure around the membrane is less than 2 psi. This small change of pressure minimizes the pressure fluctuation or cycling of the membranes. Also by controlling the sweep air at the inlet versus the outlet, dry air from the interior of the reservoir 26 is flowing through the control valve 58. This not only extends the life of the control valve 58 but also does not require a heater at the control valve 58 to prevent freezing.

The interior of the reservoir 26 may include a support bracket 90 welded or otherwise suitably attached thereto as shown in F*igure* 2. A seat 92 receives end cap 41A of the membrane dryer 40. O-rings may be provided on end cap 41A to secure the end cap 41A in the seat 92 and to minimize harmful vibration between the two. A cam surface 94 is provided to guide and align the end cap 41A into the seat 92.

The variation on the three pre-filter configuration of FIG. 2 is illustrated in FIG. 3. Those elements which have the same function include the same number as that described in FIG. 2. As in FIG. 2, the pre-filter of FIG. 3 provides concentric filters with inflow/outflow through the coalescer filter 62.

The major modification to FIG. 2 is that housing portions 44C and 44D have been modified. Housing portion 44C is substantially shorter while housing portion 44D is made substantially larger. Housing portion 44C still includes the annular chamber 122 and the aperture 120 in its sidewalls. It also includes the inner chamber 114 connecting the output from the carbon filter 118 to the inputs 130 in the collar 41. The housing portion 44C also includes the plurality of inlets 124 to chamber 112 which includes the filters 62 and 80.

A flange generally cylindrically wall 110 divides the interior of housing portion 44D in the chamber 112 and 116. The flanged wall 110 has a generally s-shaped cross-section. Flange portion 190 is welded or otherwise affixed to the interior of the housing 44D at 192. Flange wall 194 includes the outlets 126 between chambers 112 and 116. The end wall 194 is connected by wall 196 to an end flange 198 which abuts the face 181 of housing portion 44C at gasket 200.

Endcaps 202 on filters 62 and 80 include a gasket 204 and is seated between flange 194 of wall 110 and the face 181 of the housing portion 44C. The filter 118 includes an endcap 206 with gasket 208 which engages the face flange 198 of wall 110, as well as end wall 199. The other end of filter 118 is received in a recess 210 in housing portion 44D.

Housing portion 44C includes a lip or protuberance 182 extending therefrom. The housing portion 44D includes a lip or protuberance 180. These two protuberances 180 and 182 mate with a seal 184 in the face of protuberance 182. A v-band 186 engages both the protuberances 180 and 182 and secures them onto each other. A clamping bolt 188 tightens the v-band 186.

The housing portion 44D includes the filter 210 mounted therein between the housing portion 44D and flanges 199 and 198. The cylindrical filters 62 and 80 are then inserted into chamber 112. This unitary pre-filter package is then mounted onto the central housing section 44C with the protuberances 180 and 182 mated. The v-band 186 secures them together. This allows all three assembled filters to be removed as a unit. As in FIG. 2, fasteners 111 would have to be removed to disconnect housing portions 44C and 44B to allow removal and servicing of the membrane filter 40.

By enlarging the housing portion 44D and making the wall of housing portion 44D and with the wall 110, of sheet metal, a very inexpensive pre-filter structure results. Thus, the housing portion 44D and the filters 62, 80 and 118 may be disposed of instead of being reused.

Another modification illustrated in FIG. 3 is the provision of an additional drain for the annular chamber 122 in center housing portion 44C. Passage 212 connects sump 45 of chamber 112 to valve 84. A passage 214 in that center housing portion 44C connects the annular chamber 122 to the valve 84. The valve 84 basically opens and closes both passages 212 and 214 to empty or drain of both of the chambers. The walls of the housing portion 44D may be slightly inclined to aid the flow of condensation in sump 45 to the passage 122.

As discussed in FIG. 2, the pre-filter of FIG. 3 may include less than three filters.

A further variation of the membrane air filer with pre-filters is shown in FIGS. 4-6. The details of drain valve 84 are shown in FIGS. 7-10. Only those elements that are different then those of the previous drawings will be explained in detail. Where possible the same reference numbers have been used.

Compared to FIG. 3 the housing portions 44B and 44C have been combined. Thus there is a single manifold for the air inlet 46 and to receive the membrane housing portion 44A. The combined housing portion of 44B and 44C, as well as, housing part 44D are secured to the collar 27 which is welded to the reservoir 26.

The coalescing filter element 62 is shown as a conical coalescent filter, having a larger diameter at end cap 202A at the filter inlet than the end cap 202B adjacent to the outlet of the filter 62. The end cap 202A includes a flange 201 clamped between housing portion 44B, C and protrude element 180 of housing portion 44D. The plurality of spaced apertures 203, are provided in the flange 201 to connect the chamber 114 to sump 45. The other end cap 202B rests on wall 110 which is integrally formed as part of the body portion 44B, C. The end cap 202B may also include space holes or slots to allow liquid to drain off the end of the filter into sump 45.

The end cap 202A forms a wall of the annular chamber 122. A baffle plate 216, shown in phantom is secured in place by ring 218. This defines the opening 124 between the chamber 122 and the inlet of filter 62 this allows fine tuning by varying the size of the baffle 216.

The conical shape coalescing filter directs the liquid which coalesces on the top of the unit to drain away. This minimizes the size of the area on the top of the coalescing filter 62 which might otherwise saturate and subsequently subject to freezing.

The membrane filter or separator housing 44A is received in a bore 220 of housing portion 44B, C and extends cantilever therefrom into the reservoir 26. A plurality of space veins or ribs 222 on the exterior housing portion 44B, C interior of the reservoir 26 provide increased stiffness to the housing. This allows the membrane housing 44A to cantilever extend in a stable condition with respect to the transient forces of the vehicle on which the reservoir is mounted. This eliminates the need and the costs of the bracket 90 shown in FIG. 2.

The end of bore 220 is a split ring having a split 224 illustrated in FIG. 5. The membrane housing 44A is secured in the bore 220 by a clamp 226 including a pair of pinch fasteners 228.

As distinguished from FIGS. 2 and 3, the axial position of the circumferential chambers 135 and 136 and the radial passages 138 of the inlet of the sweep air passage and the circumferential chambers 54A, 162 and radial passages 160 of the sweep air outlet have been reversed in the manifold.

Body portion 44B, C includes a check valve 230. The check valve 230 connects the annular air input chamber 122 to the interior of the reservoir 26 to bypass the filter assembly when the pressure at the annular air input chamber 122 exceeds that pressure in the reservoir 26 by a predetermined amount. Cracking pressure on the check valve 122 is selected to be sufficiently higher than the expected pressure drop across the air dryer assembly at high flows, so it does not open during normal operation of the air dryer assembly. But the value is low enough to assure sufficient air pressure in the reservoir for safe operation of the brakes. Thus if the reservoir assembly becomes frozen or otherwise blocked, the reservoir can still be charged in a safe manner which allows operation of the air brakes on the vehicle.

Figure 7:
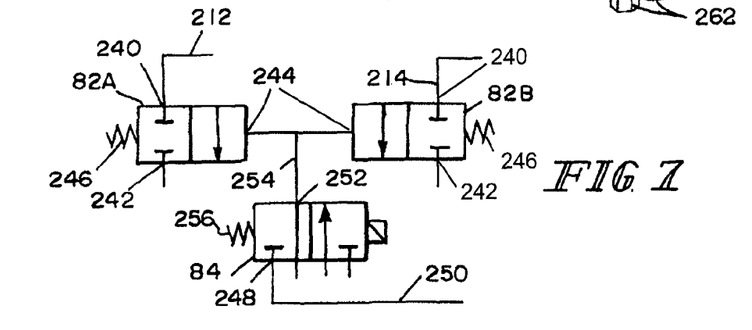
FIG. 7 is a schematic of the drain valve assembly of FIG. 4.

A schematic of the drain valves 82, 84 is illustrated in FIG. 7. A pair of pilot valves, 82A and 82B, are connected to drain passages 212 and 214 respectively. Each of the pilot valves includes an inlet 240 and an outlet 242. They also include a pilot port 244. They are biased by spring 246 to their closed position as illustrated in FIG. 7. A solenoid control valve 84 includes an inlet 248 connected to passage 250 to a source of air. In the present disclosure, the source of air is the dry air in the reservoir 46. The outlet 252 of the solenoid valve 84 is connected via passage 254 to the pilot ports 244 of the valves 82. Solenoid valve 84 is biased by spring 256 to its closed position as illustrated in FIG. 7. As shown in, FIGS. 8 thru 10, the solenoid valve includes electrical contacts 258.

Figure 8:
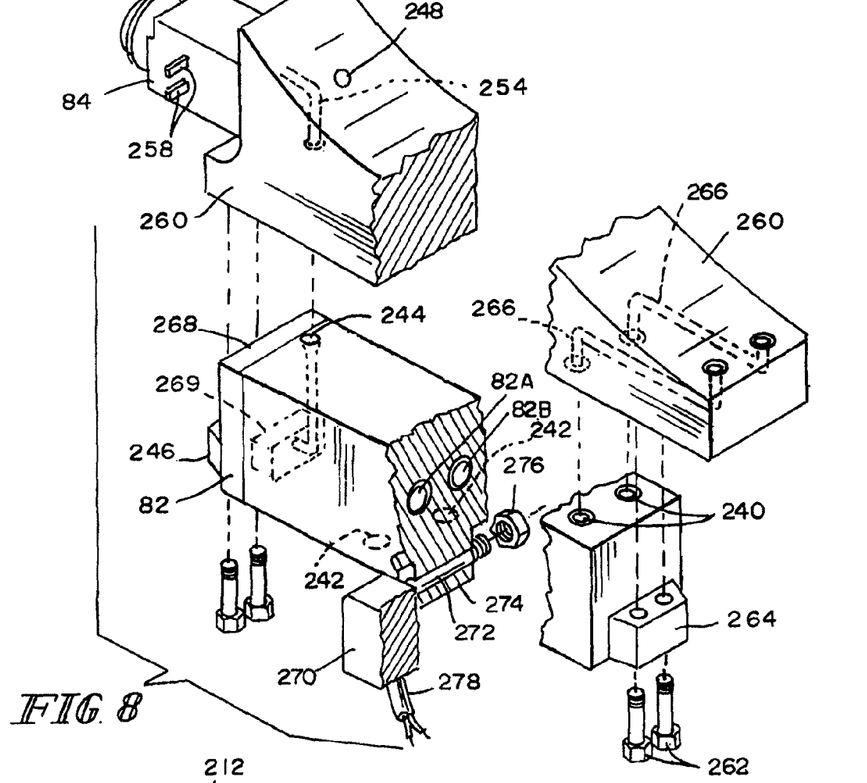
FIG. 8 is an exploded perspective cut-away view of the drain valve assembly of FIG. 4.

The drain valve 82 and the solenoid valve 84 are shown in detail in FIG. 8. For the connection to the housing portion 44B, C reference should be made to FIGS. 4 and 6. A manifold 260 is welded to the housing portion 44B, or cast and machined integral to housing 44B and includes a pair of passages 266 to connect the passages 212 and 214 from the housing portion 44B, C to the inlets 240 of the drain valves 82A and B. The solenoid valve 84 is mounted to the manifold 260 and includes the inlet 248 connected to passage 250 of housing part 44B, C which is connected to the interior of the reservoir 26. The output passage 254 in the manifold 260 from the solenoid 84 provides the input to the pilot port 244 of the drain valve 82 and the drain valves 82A and B are secured to the manifold 260 by a pair of fasteners 262 through openings in ears 264 on each side of the housing of the drain valve 82. An end cap 268 is removable connected to the body of the drain valve 82. The passage 244 terminates in a recess 269 in the end cap 268 as the common pilot chamber for the pair of drain valves 82A and 82B as shown in FIG. 8.

The use of two different drain valves for the pre-filter at the input and output of the pre-filters allows both sides to be vented simultaneously, therefore preventing undesirable pressure difference across the coalescing filter 62. This also prevents transfer of condensation from one condensation chamber to the other due to small the natural pressure differential across the coalescing filters 62 when air is flowing.

Also the use of dry air from the reservoir 26 to actuate the pilot actuated valves 82 prevents freezing and contamination of the solenoid and pilot side of the pilot valves. The pilot operates both valves.

A heater 270 has a heating element 272 extending through a port 274 of the housing for the drain valves 82. The threaded end of element 272 receives a threaded cap 276. The heater 72 is optional to prevent the drain valves from freezing. Although, the heating element 272 has shown transverse to the drain valves 82A and 82B in the embodiment of FIGS. 4-6 and 8, for the embodiment to be discussed in FIGS. 9 and 10, the heating element is parallel to and position centered between the pair of pilot valves 82A and 82B.

Figure 9:
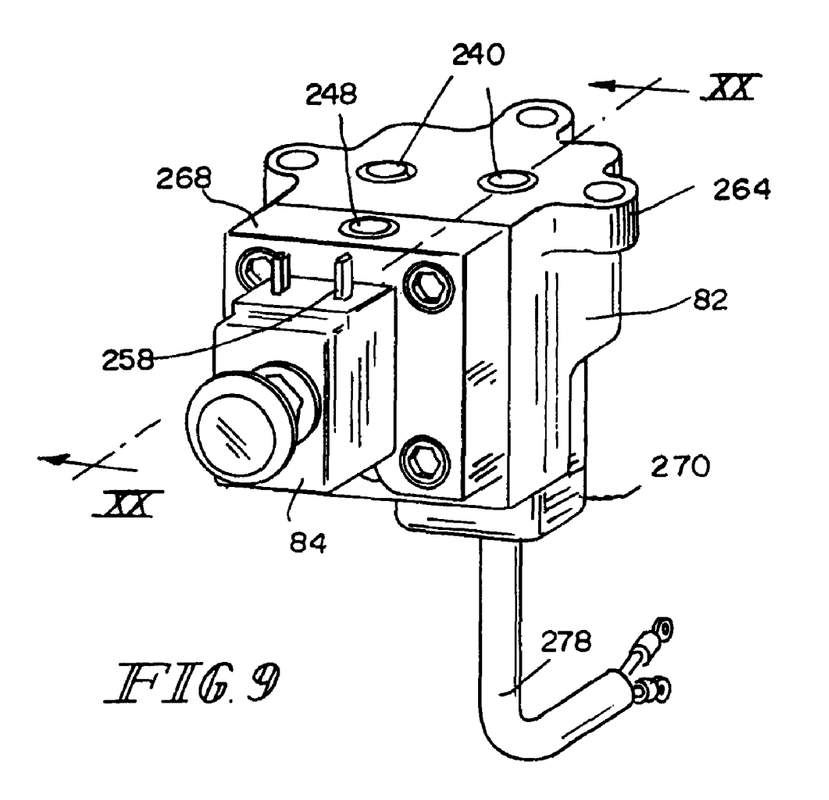
FIG. 9 is a perspective view of another drain valve assembly according to the present disclosure.
Figure 10:
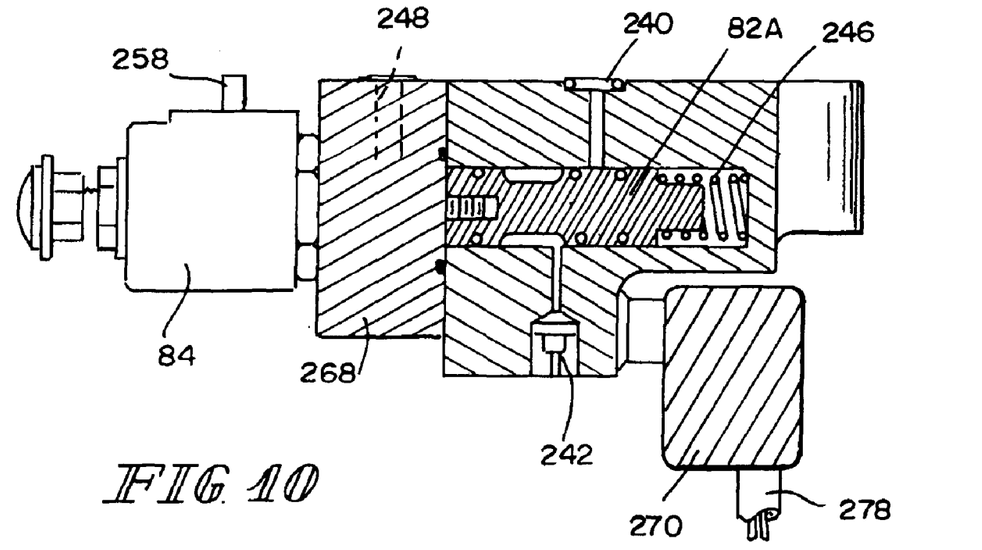
FIG. 10 is a cross-sectional view along lines XX-XX of FIG. 9.

As shown FIGS. 9 and 10, the solenoid valve 84 is mounted to the end cap 268 of the pilot valves 82. The inputs 248 and 240 for the solenoid valve and the pilot valve respectfully are in a common plane and can be connected to manifold 260 or to appropriate ports on the body portion 44B and C. This spool valve 82A and spring 246 are shown specifically in the cross section of FIG. 10.

Although the present method has been described and illustrated in detail, it is to be clearly understood that this is done by way of illustration and example only and is not to be taken by way of limitation. Although the dryer has been shown in a train air supply system, it can also be used in a truck brake system. The particular filter structure may be used even if it is not mounted interior the reservoir. The scope of the present method is to be limited only by the terms of the appended claims.

What is claimed:

1. A reservoir having an inlet and a filter mounted in the reservoir inlet and extending into the interior of the reservoir so that an inlet of the filter is the inlet of the reservoir and an outlet of the filter is interior the reservoir, the filter comprising:
    a housing;
    a membrane separator mounted in a bore of the housing and extending cantileverly from the housing into the reservoir; and
    circumferentially spaced vanes on the housing extending in the reservoir along an axis of the bore.

2. The reservoir according to claim 1, wherein an end of the bore is a split collar and a clamp secures the membrane separator in the split collar.

3. The reservoir according to claim 1, wherein the bore has two axially spaced circumferential recesses connecting the bore to a source of sweep air and an exhaust port respectively; a sweep air inlet and a outlet on a circumference of the membrane separator are aligned with respective recess; and at least one of the recesses is in the reservoir.

4. The reservoir according to claim 1, including a conical filter element connected in series between the filter inlet and an inlet of the membrane separator and the filter element has a larger diameter at an inlet of the filter element than a diameter at an outlet of the filter element.

5. The reservoir according to claim 4, including an annular chamber connecting the filter inlet to the filter element inlet and an end face of the filter element forms a wall of the annular chamber.

6. The reservoir according to claim 4, wherein the housing includes first and second portion removeably connected to each other; and the filter element includes a flange at the inlet of the filter element clamped by the first and second portions.

* * * * *